United States Patent
Glaesser

(10) Patent No.: US 7,832,968 B2
(45) Date of Patent: Nov. 16, 2010

(54) MILLING METHOD FOR THE PRODUCTION OF COMPONENTS

(75) Inventor: Arndt Glaesser, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 642 days.

(21) Appl. No.: 10/564,206

(22) PCT Filed: Jul. 3, 2004

(86) PCT No.: PCT/DE2004/001426

§ 371 (c)(1),
(2), (4) Date: Jan. 9, 2006

(87) PCT Pub. No.: WO2005/005083

PCT Pub. Date: Jan. 20, 2005

(65) Prior Publication Data

US 2006/0177281 A1    Aug. 10, 2006

(30) Foreign Application Priority Data

Jul. 8, 2003    (DE) ................................ 103 30 831

(51) Int. Cl.
*B23C 3/18* (2006.01)
(52) U.S. Cl. .................. 409/132; 409/193; 700/178
(58) Field of Classification Search ............. 700/178, 700/173, 184, 190; 409/79–80, 147–155, 409/186–188, 193–195, 131–132
See application file for complete search history.

(56) References Cited

U.S. PATENT DOCUMENTS

| | | | | |
|---|---|---|---|---|
| 4,031,809 A | * | 6/1977 | Shraiman et al. | 409/84 |
| 4,489,377 A | * | 12/1984 | Mawyer et al. | 700/178 |
| 4,518,288 A | * | 5/1985 | Cilindro | 409/219 |
| 4,720,796 A | * | 1/1988 | Kishi et al. | 700/178 |
| 4,723,219 A | * | 2/1988 | Beyer et al. | 700/190 |
| 5,003,484 A | * | 3/1991 | Vollmayr | 700/161 |
| 5,107,436 A | * | 4/1992 | Levine et al. | 700/186 |
| 5,122,966 A | * | 6/1992 | Jansen et al. | 700/178 |
| 5,391,024 A | * | 2/1995 | Levine et al. | 409/84 |
| 5,710,709 A | * | 1/1998 | Oliver et al. | 700/184 |
| 5,727,296 A | * | 3/1998 | Kobler | 29/27 C |
| 5,825,017 A | | 10/1998 | Pryor | |
| 6,311,100 B1 | * | 10/2001 | Sarma et al. | 700/190 |
| 6,485,236 B1 | * | 11/2002 | Engeli et al. | 409/132 |
| 6,632,053 B2 | * | 10/2003 | Koch | 409/132 |

(Continued)

FOREIGN PATENT DOCUMENTS

EP    1 146 408    10/2001

(Continued)

*Primary Examiner*—Daniel W Howell
(74) *Attorney, Agent, or Firm*—W. F. Fasse; W. G. Fasse

(57) ABSTRACT

In a milling method for producing a structural component from a raw material by chip-cutting, a milling tool is moved along at least one defined tool path for the milling. In addition to the at least one tool path, at least one collision contour is also defined. The position or orientation of the milling tool relative to the collision contour(s) is monitored. The position or orientation of the milling tool is changed and/or an error message is generated if at least one of the collision contours is damaged, i.e. intersected, by the milling tool.

20 Claims, 2 Drawing Sheets

U.S. PATENT DOCUMENTS

| | | | |
|---|---|---|---|
| 7,251,543 B2 * | 7/2007 | Nakamura | 700/178 |
| 7,319,913 B2 * | 1/2008 | Kanbayashi et al. | 700/178 |
| 7,340,321 B2 * | 3/2008 | Glaesser | 700/187 |
| 2001/0048857 A1 | 12/2001 | Koch | |
| 2005/0010324 A1 * | 1/2005 | Kaever et al. | 700/178 |
| 2006/0291969 A1 * | 12/2006 | Koch | 409/132 |

FOREIGN PATENT DOCUMENTS

| | | | |
|---|---|---|---|
| JP | 61044522 A | * | 3/1986 |
| WO | WO 93/23820 | | 11/1993 |

\* cited by examiner

MILLING METHOD FOR THE PRODUCTION OF COMPONENTS

FIELD OF THE INVENTION

The invention relates to a milling method for the production of structural components.

BACKGROUND INFORMATION

The present invention relates to the field of milling technology, especially the HSC milling (High Speed Cutting milling), which is also designated as HPC milling (High Performance Cutting milling).

In the milling of a workpiece for the production of a structural component, it is of decisive significance, that the miller or the milling tool, during the milling, does not damage the geometry or freeform surface of the structural component that is to be milled. If, for example, the structural component to be milled is a rotor with integral blading, whereby for such a rotor, flow channels are to be milled-out between neighboring blades with the aid of the milling method, then the miller or the milling tool, during the milling-out of a flow channel, may not damage the blades bounding the flow channel or the corresponding blade surfaces thereof. Accordingly, a collision of the miller with the blades or blade surfaces must be surely prevented. This is especially significant when the tool paths or the tool vectors are defined through the use of cutting advance or lead angles and clearance or pitch angles.

SUMMARY OF THE INVENTION

Starting from this point, the underlying problem on which the present invention is based, is to propose a novel milling method for the production of structural components.

This problem is solved in that the above initially mentioned milling method is further developed by the features of the present invention.

According to the invention, at least one collision contour is defined in addition to the or each tool path, whereby the position or orientation of the milling tool relative to the or each collision contour is monitored, and whereby the position or orientation of the milling tool is changed and/or an error message is generated if at least one of the collision contours is damaged by the milling tool. With the present invention, an especially effective method is proposed, in order to surely avoid a collision of the miller with surfaces of the structural component to be produced.

According to an advantageous embodiment of the invention, for the milling of depressions or recesses that are bounded by two sidewalls, two collision contours are defined, whereby a first collision contour corresponds to a first sidewall and a second collision contour corresponds to a second sidewall. In the case in which the milling tool damages the collision contour that corresponds to the first sidewall that is currently to be milled, the position or orientation of the milling tool is changed in such a manner that the damage of the collision contour is removed. In the case in which the milling tool damages the collision contour that corresponds to the second sidewall, which lies opposite the first sidewall that is currently to be milled, an error protocol and/or an error message is generated.

Preferred further embodiments of the invention arise from the dependent claims and from the following description.

BRIEF DESCRIPTION OF THE DRAWINGS

An example embodiment of the invention, without being limited hereto, is explained in further detail in connection with the drawing. In the drawing.

DETAILED DESCRIPTION OF EXAMPLE EMBODIMENTS OF THE INVENTION

In the following, the present invention will be explained in greater detail with reference to the figures. Before the details of the inventive method will be explained, however, in the following a few terms will be defined, to which reference will be made later.

The milling machining or processing of the workpiece or material to be machined is achieved with the aid of a tool, a so-called miller. During the milling, the miller is in engagement with the material. For the processing or machining of the workpiece, the tool or the miller is moved relative to the workpiece or the material. The motion of the tool or the miller relative to the workpiece is described by so-called tool coordinates, whereby the tool coordinates define the position of a tool reference point. The motion of the tool reference point in the milling machining of the workpiece is designated as the tool path or milling path.

Beginning from a tool tip or from the tool reference point, a vector extends along a tool axis or a tool shaft of the tool or miller. This vector along the tool axis beginning from the tool tip in the direction of the tool shaft is referred to as a tool vector.

The milling machining or processing of a workpiece for the formation of a defined three-dimensional freeform surface takes place with the aid of a so-called 5-axis milling. In the 5-axis milling, the tool can be moved in five axes relative to the workpiece that is to be machined. Three axes serve for the linear relative motion of the tool relative to the workpiece, so that each point in space can be reached. In addition to this linear motion along the so-called linear axes, the tool is also movable about a pivot axis as well as a tilt axis for the realization of undercuts. Rotational motions of the tool are made possible along the pivot axis as well as the tilt axis. Hereby it is possible, that all points in space can be reached without collision. The pivot axis as well as the tilt axis are often generally also designated as round or circular axes.

Figure 1:
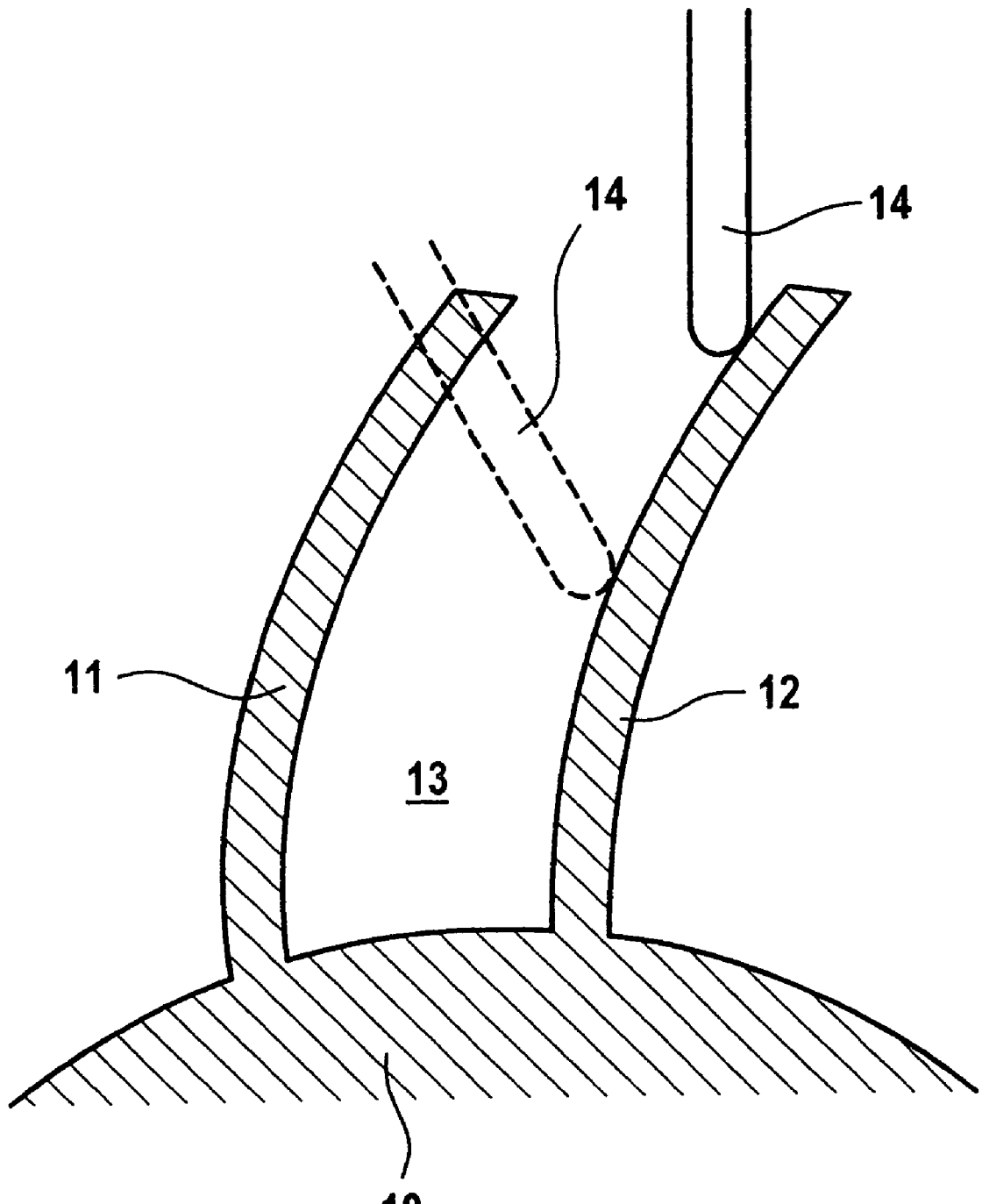
FIG. 1 shows a strongly schematized cross-section through a rotor with integral blading and with a miller in two different positions for clearly explaining the method according to the invention.
Figure 2:
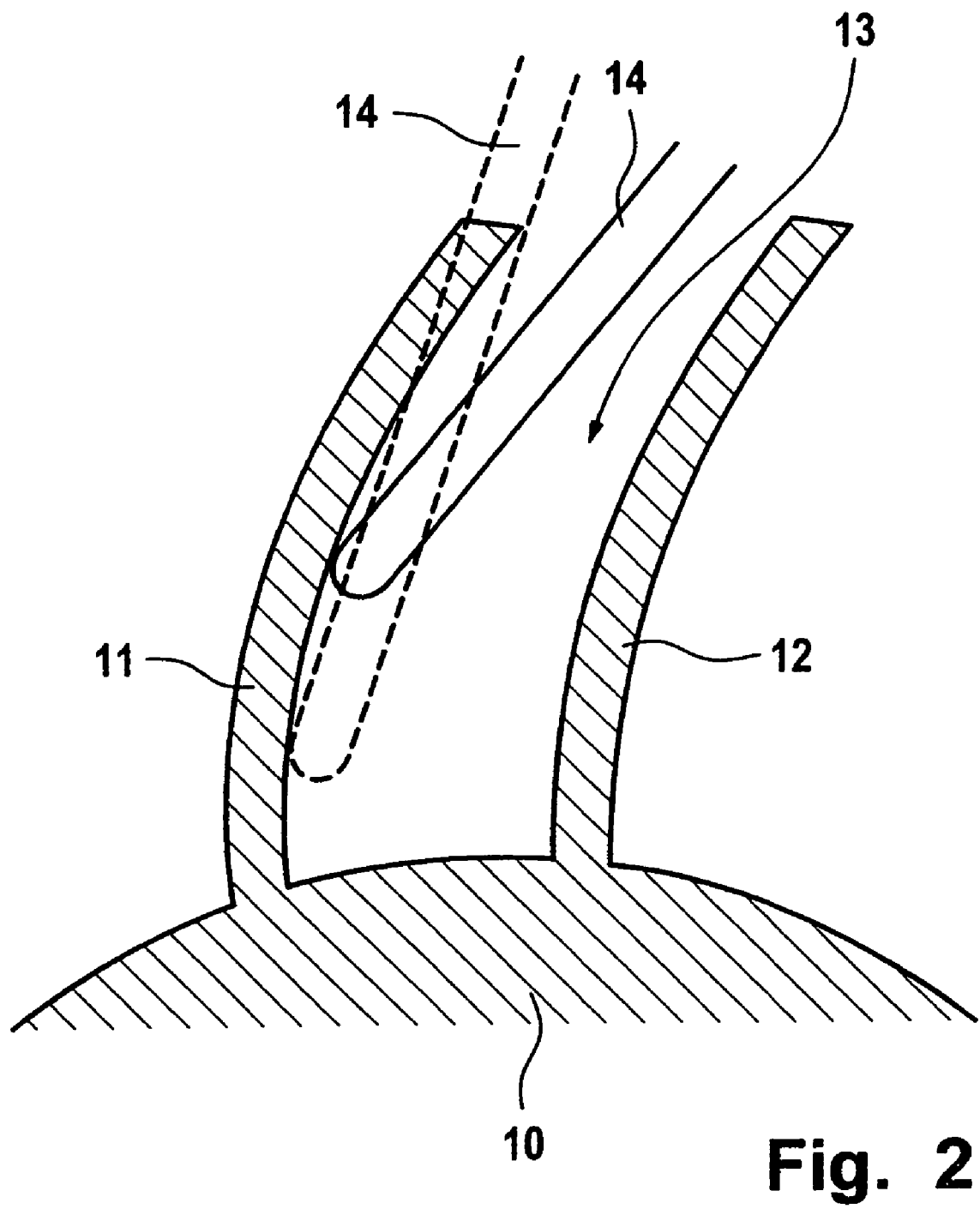
FIG. 2 shows a strongly schematized cross-section through a rotor with integral blading and with a miller in two further different positions.

In the following, the invention will be explained in greater detail with reference to FIGS. 1 and 2. FIGS. 1 and 2 show, in a strongly schematized manner, a rotor 10 with integral blading, whereby respectively two rotor blades 11, 12 are shown in FIGS. 1 and 2. A flow channel is enclosed between the rotor blades 11, 12. The inventive milling method now serves for the production of such a rotor 10, whereby through the use of a milling tool or miller, the flow channel 13 is to be milled-out in such a manner, so that the desired final contour of the rotor blades 11, 12 arises. It is pointed out once again that the illustration in FIGS. 1 and 2 is strongly schematized. The shape and dimensioning of the rotor blades 11, 12 as well as the shape and dimensioning of the flow channel 13 bounded by the rotor blades 11, 12 was selected solely for reasons of a simple illustration, and is of subordinate significance for the principle of the present invention.

In FIGS. 1 and 2, a milling tool 14 is respectively shown in two different positions. A first position of the milling tool 14 is respectively carried out in continuous solid lines and corresponds to a position or orientation of the milling tool 14 in which the milling tool 14 does not damage the desired final contour of the rotor blades 11 and 12. In this position or orientation of the milling tool, accordingly there is no collision with the structural component or rotor 10 that is to be produced. In a second position or orientation of the milling tool 14, which is shown with dashed lines in FIGS. 1 and 2, the milling tool intersects or cuts the desired final contour of the rotor blades 11 or 12, and thus collides with the structural component geometry that is to be produced. Such a collision must be avoided.

For this purpose, in the sense of the inventive method, at least one collision contour is defined in addition to the or each tool path along which the milling tool is moved during the milling machining. The position or orientation of the milling tool relative to the or each collision contour is monitored. The position or orientation of the milling tool is changed if at least one of the collision contours is damaged by the milling tool. Furthermore it is in the sense of the invention to generate an error message or an error protocol, if at least one of the collision contours is damaged. The producing or generating of the error message or the error protocol can also be carried out instead of the changing of the miller position.

As can be understood from FIGS. 1 and 2, in principle two types of collisions of the milling tool 14 with the rotor blades 11, 12 are conceivable during the milling of the flow channel 13. In the possibility shown in FIG. 1, the rotor blade 12 that bounds the flow channel 13 on the right side is milled-out with the milling tool 14. With a too-sharp tilt of the milling tool 14, a collision can arise with the other rotor blade 11, which lies opposite the rotor blade 12 that is being machined by the milling tool 14. On the other hand, FIG. 2 visualizes a collision of the milling tool 14 with the rotor blade 11 that is currently being machined by the milling tool 14. Both collision types are covered by the inventive milling method.

The collision contours that are to be defined and that may not be damaged by the milling tool 14 correspond to the surfaces or the edges of the desired final contour of the rotor blades 11 and 12 that are to be milled-out. These can be defined in that the milling tool is moved with its tip along the edges of the rotor blades of a sample model that has the desired milled shape defined by the desired final contour that is to be milled-out, and all motions that are carried out along these edges are defined as collision contours. Thus, the collision contours always refer to the desired final contour of the structural component that is to be produced, and define an area or region that the milling tool 14 may not damage, neither with its shaft nor with its radius.

In the case in which the milling tool 14 damages the collision contour that corresponds to the sidewall that is currently to be milled (see FIG. 2), the position or orientation of the milling tool 14 is changed in such a manner so that the damage of this collision contour is removed. For this purpose, the clearance or pitch angle of the tool vector is increased so far that a collision-free motion of the milling tool 14 becomes possible.

In the case in which the milling tool 14 damages the collision contour that corresponds to the sidewall that lies opposite to the sidewall that is currently to be milled (see FIG. 1), according to the invention an error message or an error protocol is generated. In this case the clearance or pitch angle of the miller is not changed.

If, during the above method, it is determined that the miller or the milling tool 14 cannot be moved without collision through the flow channel 13, which is bounded by the collision contours, then according to the invention the miller radius or miller diameter of the milling tool is adapted. The miller diameter must then be reduced so far that a collision-free production of the structural component is possible. Alternatively it is also possible to adapt the cutting advance or lead angles, so that a collision-free production of the structural component is possible with changed cutting advance or lead angles.

With the aid of the present invention, a milling method is proposed, in which the tool paths or the tool vectors are defined by prescribing cutting advance or lead angles and clearance or pitch angles, and whereby simultaneously a collision of the miller with the surfaces of the structural component to be produced can be surely avoided. Thereby the milling machining or processing of structural components is improved overall. The inventive method can be applied especially advantageously in connection with 5-axis milling.

The inventive milling method can especially be utilized or applied for the production of integral bladed rotors for gas turbines, so-called bladed disks (blisks) or bladed rings (blings).

The invention claimed is:

1. A milling method for the production of a structural component having a desired final contour to be produced by milling from at least one material that is difficult to machine by chip-cutting, while producing depressions with at least one sidewall, whereby a milling tool is moved along at least one defined tool path for the milling, characterized in that, in addition to the or each tool path, at least one collision contour respectively corresponding to a surface or an edge of the at least one sidewall of the desired final contour of the structural component to be produced is defined and the position or orientation of the milling tool along the or each tool path relative to the or each collision contour is monitored in an automated comparison of the or each tool path with the or each collision contour to determine whether an expected collision exists between the milling tool and the at least one collision contour corresponding to the surface or the edge of the desired final contour of the structural component to be produced, and if the expected collision is determined to exist then the position or orientation of the milling tool is changed and/or an error message is generated to avoid the structural component being damaged by the milling tool.

2. The method according to claim 1, characterized in that the position or orientation of the milling tool along the or each tool path relative to the structural component to be produced are determined by a tool vector, whereby the tool vector is defined with a cutting advance angle and a pitch angle of the milling tool.

3. The method according to claim 1, characterized in that, for the milling of the depressions that are bounded by two of the sidewalls, two collision contours are defined, of which a first collision contour lies on a first said sidewall and a second collision contour lies on a second said sidewall.

4. The method according to claim 3, characterized in that, when the milling tool damages the collision contour that lies on the sidewall that is currently to be milled, the position or orientation of the milling tool is changed so that the expected collision of the milling tool with the collision contour is avoided.

5. The method according to claim 4, characterized in that a pitch angle of a tool vector is increased for changing the position or orientation of the milling tool so that the expected collision of the milling tool with the collision contour is avoided.

6. The method according to claim 3, characterized in that, when the milling tool is expected to collide with the collision contour that lies on the sidewall lying opposite the sidewall that is currently to be milled, an error protocol and/or an error message is generated.

7. The method according to claim 6, characterized in that the error protocol is used for the dimensioning of the milling tool.

8. The method according to claim 6, characterized in that the error protocol is used for determining a miller diameter of the milling tool.

9. The method according to claim 1, characterized in that the structural component to be produced is an integral bladed rotor for a gas turbine, wherein the depressions form flow channels and the sidewalls form blade surfaces of the integral bladed rotor.

10. The method according to claim 1, wherein the error message is generated if the milling tool is expected to collide with at least one of the collision contours.

11. The method according to claim 1, wherein each said collision contour is respectively defined by moving the milling tool along and in contact with a respective one of the edges of a sample of the component to be produced.

12. A method of producing a milled component having a desired milled shape defined by a desired final contour to be produced by milling a raw material with a milling tool, comprising the steps:
   a) defining a proposed tool path along which said milling tool will be moved to mill said raw material into said desired milled shape of said milled component, wherein said tool path defines the space that will be occupied by said milling tool as said milling tool is moved to mill said raw material;
   b) defining at least one collision contour of said desired milled shape of said milled component, wherein each said collision contour establishes a respective boundary which may not be crossed by said proposed tool path to avoid damaging said desired milled shape of said milled component to be produced;
   c) comparing said proposed tool path with said at least one collision contour to determine whether said proposed tool path crosses said at least one collision contour;
   d) if said proposed tool path is determined to cross said at least one collision contour in said step c), then generating a collision signal indicative of a collision, and in response to said collision signal, revising said proposed tool path to thereby define a final tool path that will not cross said at least one collision contour;
   e) if said proposed tool path is determined not to cross said at least one collision contour in said step c), then using said proposed tool path as said final tool path; and
   f) milling said raw material by moving said milling tool along said final tool path to produce said milled component.

13. The method according to claim 12, wherein said collision signal comprises an error message indicating to an operating personnel that said collision has been determined.

14. The method according to claim 12, wherein said collision signal comprises an error protocol that is carried out if said collision has been determined.

15. The method according to claim 12, wherein said step of defining said at least one collision contour comprises moving said milling tool along and in contact with at least one edge of a sample model that has said desired milled shape of said milled component, wherein said at least one edge thereby defines said at least one collision contour.

16. The method according to claim 12, wherein said comparing in said step c) is carried out as an automated comparison.

17. A milling method for the production of a structural component from at least one material that is difficult to machine by chip-cutting, while producing depressions with at least one sidewall, whereby a milling tool is moved along at least one defined tool path for the milling, characterized in that, in addition to the or each tool path, at least one collision contour respectively corresponding to an edge of the at least one sidewall of the structural component to be produced is defined and the position or orientation of the milling tool along the or each tool path relative to the or each collision contour is monitored in an automated comparison of the or each tool path with the or each collision contour to determine whether an expected collision exists between the milling tool and the at least one collision contour corresponding to the edge of the structural component to be produced, and if the expected collision is determined to exist then the position or orientation of the milling tool is changed and/or an error message is generated to avoid the structural component being damaged by the milling tool.

18. The method according to claim 17, wherein each said collision contour respectively corresponds exactly to only one of the edges of the component to be produced, and said at least one collision contour does not collectively define an entire topography of a surface of the structural component to be produced.

19. A method of producing a milled component by milling a raw material with a milling tool, comprising the steps:
   a) defining a proposed tool path along which said milling tool will be moved to mill said raw material into a desired milled shape of said milled component, wherein said tool path defines the space that will be occupied by said milling tool as said milling tool is moved to mill said raw material;
   b) defining at least one collision contour of said desired milled shape of said milled component, wherein each said collision contour corresponds to an edge of said desired milled shape of said milled component and establishes a respective boundary which may not be crossed by said proposed tool path to avoid damaging said desired milled shape of said milled component to be produced;
   c) comparing said proposed tool path with said at least one collision contour to determine whether said proposed tool path crosses said at least one collision contour;
   d) if said proposed tool path is determined to cross said at least one collision contour in said step c), then generating a collision signal indicative of a collision, and in response to said collision signal, revising said proposed tool path to thereby define a final tool path that will not cross said at least one collision contour;
   e) if said proposed tool path is determined not to cross said at least one collision contour in said step c), then using said proposed tool path as said final tool path; and
   f) milling said raw material by moving said milling tool along said final tool path to produce said milled component.

20. The method according to claim 19, wherein each said collision contour respectively corresponds exactly to only one said edge of said desired milled shape of said milled component, and said at least one collision contour does not collectively define an entire topography of said desired milled shape of said milled component.

* * * * *